United States Patent
Friedman et al.

(10) Patent No.: US 7,717,492 B2
(45) Date of Patent: May 18, 2010

(54) VEHICLE ROLLOVER PROTECTION ROOF GEOMETRY AND STRUCTURE

(75) Inventors: Donald Friedman, Santa Barbara, CA (US); Raphael Hilary Grzebieta, Springvale (AU)

(73) Assignee: Safety Engineering International, L.L.C., Goleta, CA (US)

( * ) Notice: Subject to any disclaimer, the term of this patent is extended or adjusted under 35 U.S.C. 154(b) by 0 days.

(21) Appl. No.: 12/196,594

(22) Filed: Aug. 22, 2008

(65) Prior Publication Data

US 2010/0045074 A1    Feb. 25, 2010

(51) Int. Cl.
*B62D 25/06* (2006.01)
(52) U.S. Cl. .......................... 296/102; 280/756
(58) Field of Classification Search .................. 296/102, 296/190.03, 210; 180/311; 280/756
See application file for complete search history.

(56) References Cited

U.S. PATENT DOCUMENTS

| | | | |
|---|---|---|---|
| 3,502,368 A | 3/1970 | Maxa | |
| RE28,876 E | 6/1976 | Notestine et al. | |
| D262,790 S | 1/1982 | Bernier | |
| 4,798,399 A | 1/1989 | Cameron | |
| 4,900,058 A | 2/1990 | Hobrecht | |
| D350,724 S | 9/1994 | Lichtbach | |
| D478,025 S | 8/2003 | Cartwright | |
| D481,003 S | 10/2003 | Bauer et al. | |
| D513,223 S | 12/2005 | Saito et al. | |
| 7,219,925 B2 | 5/2007 | Hill | |
| 7,261,321 B2 | 8/2007 | Della Valle | |
| D558,123 S | 12/2007 | Murillo | |
| 7,338,112 B2 | 3/2008 | Gilliland et al. | |
| 2002/0084297 A1 | 7/2002 | Williams et al. | |
| 2005/0230176 A1* | 10/2005 | Wang | 180/282 |
| 2008/0084054 A1 | 4/2008 | Liesaus et al. | |

FOREIGN PATENT DOCUMENTS

| | | |
|---|---|---|
| EP | 0548461 A1 | 6/1993 |
| EP | 1203679 | 5/2002 |
| GB | 2306408 A | 5/1997 |

* cited by examiner

*Primary Examiner*—Lori L Lyjak
(74) *Attorney, Agent, or Firm*—Felix L. Fischer (57) ABSTRACT

A vehicle geometry for rollover crush resistance is created by determining a center of mass providing a roll axis and establishing a roof line contact surface spaced from the center of mass by a hoop radius substantially equal to a major radius of roll contact from the roll axis. As a first embodiment, the roof line contact surface is established in original designs for vehicles as a monocoque structure. As a second embodiment, provided as an original equipment manufacture (OEM) item or retrofit structural assembly, an arcuate member shaped as a byte of the hoop radius is employed and is mounted between two side rails with additional structural supports for the arcuate member on a nominally flat roofline.

27 Claims, 10 Drawing Sheets

VEHICLE ROLLOVER PROTECTION ROOF GEOMETRY AND STRUCTURE

BACKGROUND

1. Field of Invention

This invention relates to vehicle rollover protection. In particular, the invention relates specifically to a roof geometry for increased rollover crush resistance and a structure for integration or retrofit in vehicles to provide an enhanced structural capability for the protective geometry.

2. Description of Prior Art

Figure 1A:
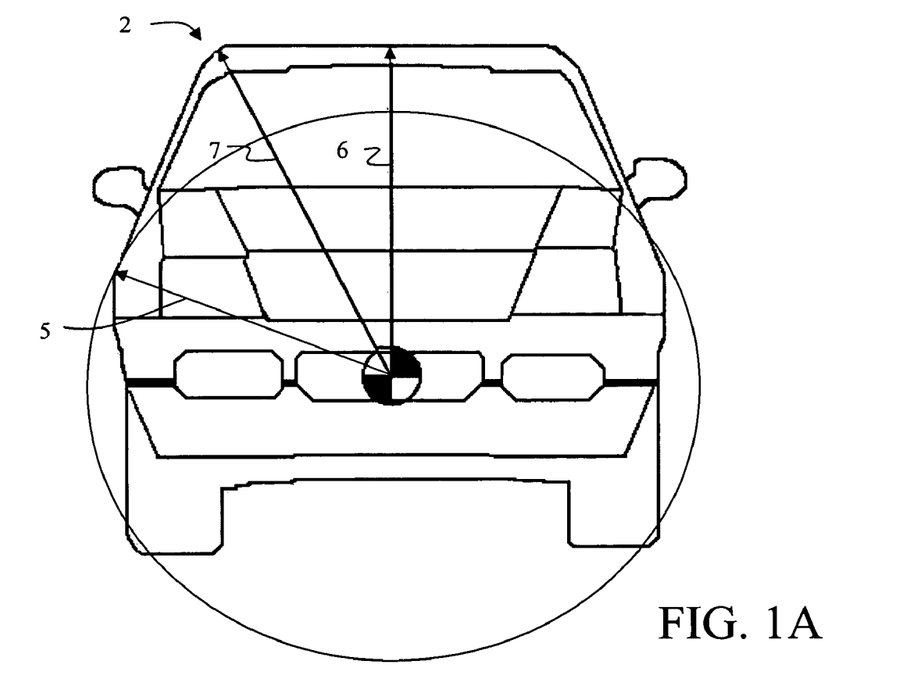
FIG. 1A is a front view of a conventional sport utility vehicle demonstrating the roll axis with the associated roll radius and radius from the center of mass (CoM)
Figure 1B:
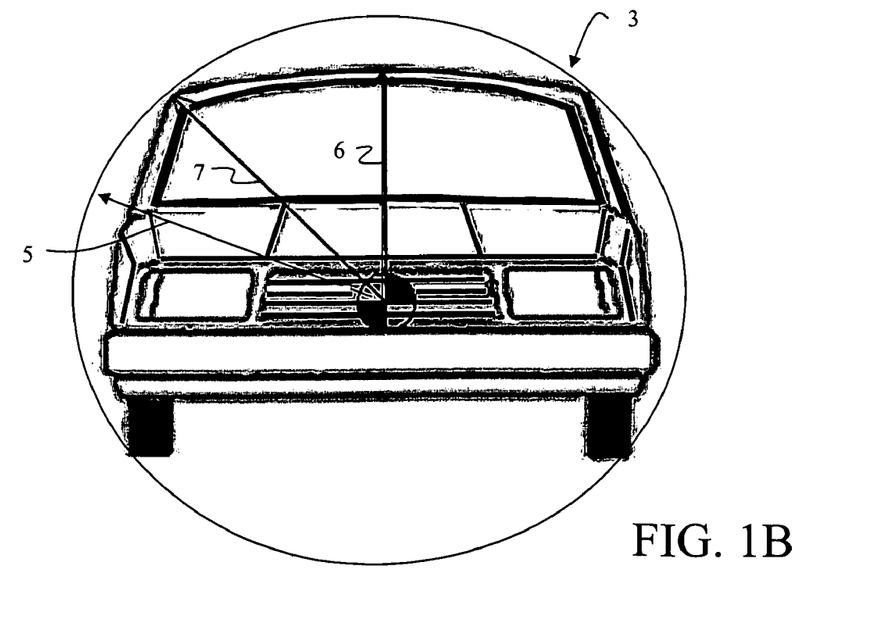
FIG. 1B is a front view of a conventional sedan showing roll axis, roll radius and radius from the CoM.

Rollovers have been and continue to be a significant cause of occupant fatalities and serious injuries. When a vehicle rolls over the laws of physics induce the roll about a longitudinal roll axis which passes through the center of mass of the vehicle. As the vehicle rolls, it touches down on each corner of the vehicle when viewed from the front as in FIGS. 1A and 1B. A vehicle like a sport utility vehicle (SUV) 2 shown in FIG. 1A and a passenger car 3 shown in FIG. 1B have different aspect ratios and therefore the roll radius 5 to the corners varies considerably. The radius from the Center of Mass (CoM) also varies to the various surfaces of each vehicle and is usually shorter to the top of the vehicle, represented by radius 6, than to the corners created by the sides and roofline, represented by radius 7.

The sequence of a rollover involves the vehicle moving laterally in the direction of travel, tipping towards the ground and contacting the roof rail on the near side (the first side to contact) and then contacting the second or far side roof, then the far side wheels, before continuing around to the near side wheels. The near side contact usually produces forces oriented into the near side pillars, limiting the extent of their deformation. The far side forces are typically more lateral and therefore more easily bend the pillars. Between the first near side contact at maximum radius, the flat of the roof can contact the ground. The CG falls towards the ground before being forced to rise as the far side corner with the larger radius rolls over the ground. If the roof is strong enough it does raise the CG, but if not, it collapses. The difference between the radii to the flat and the corner is a measure of the aggressivity of the structure.

Prior art rollover protection structures such as those disclosed in U.S. Pat. Nos. 3,662,177 issued to Notestine et al on Nov. 23, 1971 or 4,900,058 issued to Hobrecht on Feb. 13, 1990 which are designed for aftermarket retrofit on vehicles which may be more subject to rollover conditions such as four wheel drive vehicles, sport utility vehicles or pickup trucks employ geometric designs that require significant vertical structural elements that intrude into the cabin or usable space in the vehicle interior or must be affixed outside the normal outline of the vehicle to achieve the necessary support as disclosed in U.S. Pat. No. 7,338,112 issued to Gilliland on Mar. 4, 2008.

It is therefore desirable to maintain the rolling radius from the corner and across the flat which significantly reduces far side deformation. Additionally, it is desirable to support the roof at the major radius with a strongly cord supported bow, to transfer loads from side to side bringing the strength of pillars on both sides into play for each roof rail contact.

SUMMARY OF THE INVENTION

A vehicle geometry for rollover crush resistance is created by determining a center of mass providing a roll axis and establishing a roof line contact surface spaced from the center of mass by a hoop radius substantially equal to a major radius of roof roll contact from the roll axis. The roof line contact surface may be established in original designs for vehicles as a monocoque structure or provided as an original equipment manufacture (OEM) item or retrofit structural assembly using an arcuate member shaped as a byte of the hoop radius, which is mounted between two side rails on a nominally flat roofline with additional structural supports for the arcuate member.

For a nominally flat roofed vehicle, the invention is employed as a cap establishing and maintaining a roof line contact surface spaced from the center of mass by a hoop radius substantially equal to a major radius of roll contact from the roll axis.

BRIEF DESCRIPTION OF THE DRAWINGS

The elements and features of the invention are further described with respect to the detailed description herein and the following drawings wherein.

DETAILED DESCRIPTION OF THE INVENTION

Figure 2:
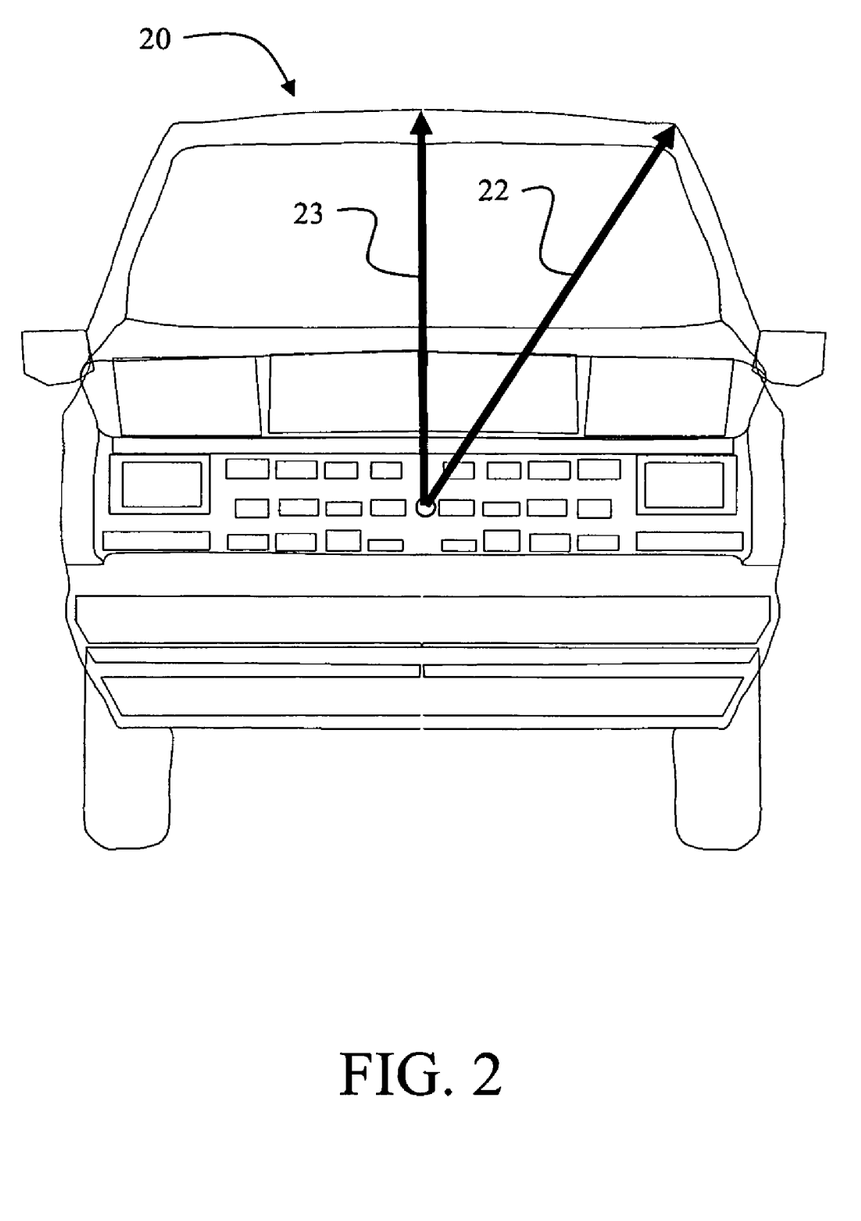
FIG. 2 is a front view of a conventional vehicle showing the major and minor radii.
Figure 3:
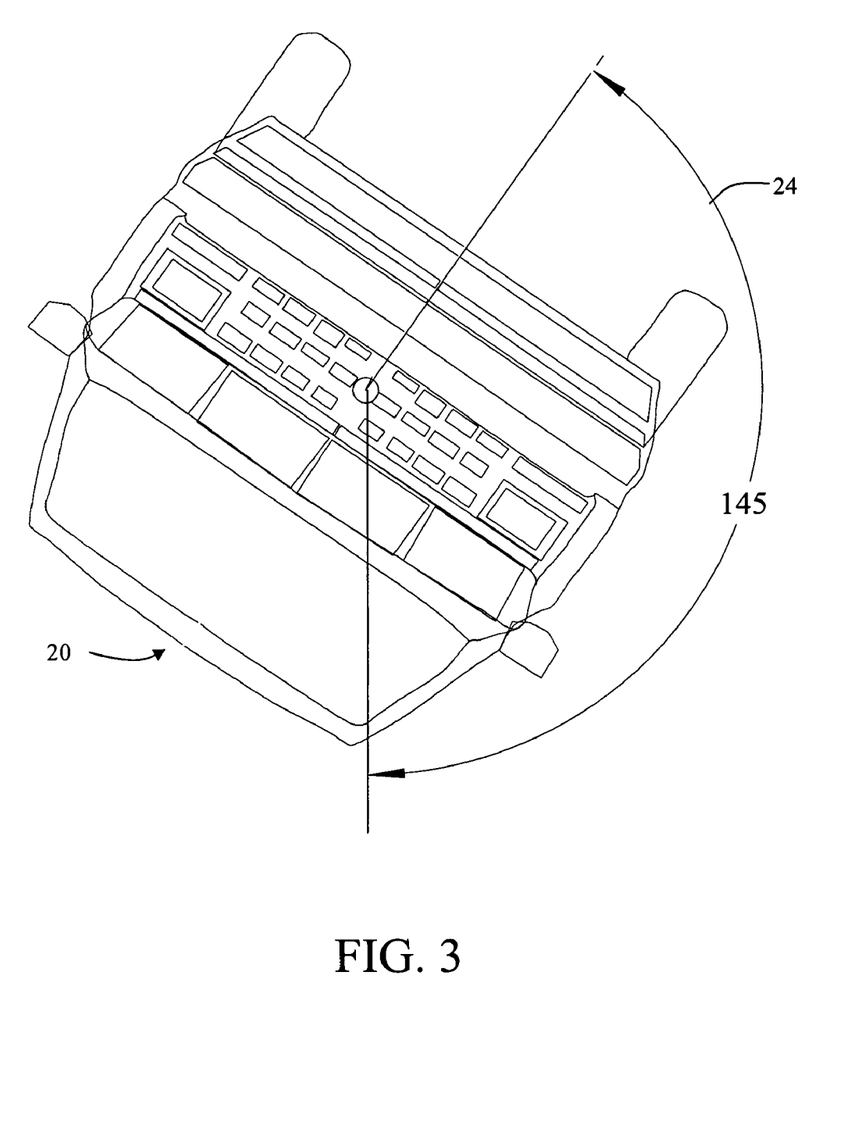
FIG. 3 is a front view of the vehicle of FIG. 2A with a nominal tripped roll position.
Figure 4:
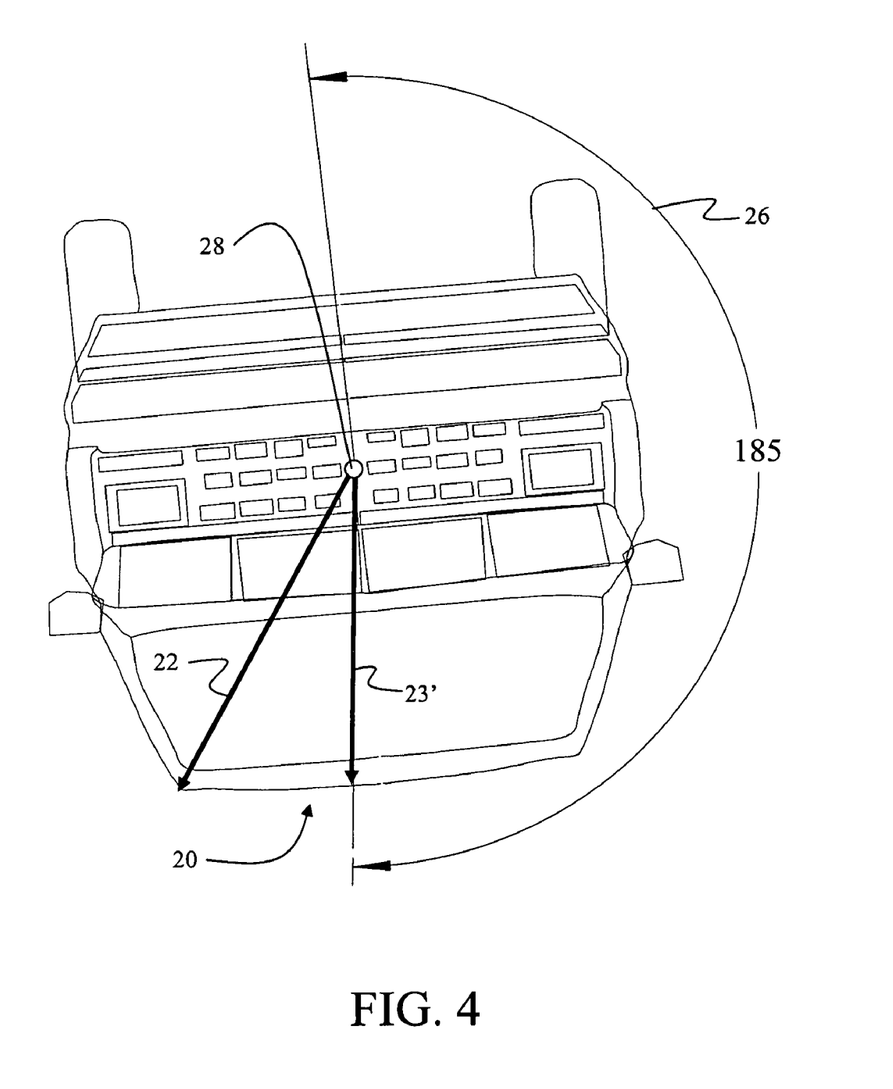
FIG. 4 is a front view of the vehicle of FIG. 2A with a likely tripped roll contact position.

When a conventional vehicle rolls, the distance from the roll axis to the closest portion of the roof is always less than the distance from the roll axis to the roof rails as shown in FIG. 2 for a conventional vehicle 20. These two radii are known as the major radius 22 and minor radius 23. When a vehicle rolls in a manner which would result in the roof panel becoming parallel and in contact with the ground (nominally at a roll angle 24 exceeding approximately 145 degrees as shown in FIG. 3), the center of gravity 28 must be lifted by about the difference between actual radius of contact 23', nominally equal to the minor radius as shown for an exemplary roll contact angle 26 of about 185 degrees in FIG. 4, and the major radius in order for the vehicle to continue rolling without roof crush. The difference between the major and minor radii is defined for purposes of the present invention as a measure of geometric aggressivity. If the roof is strong enough to oppose this lifting force without deforming, the vehicle will continue to roll with little damage to the roof. When the roof is too weak, it will deform rather than support the load needed to lift the vehicle.

Figure 5:
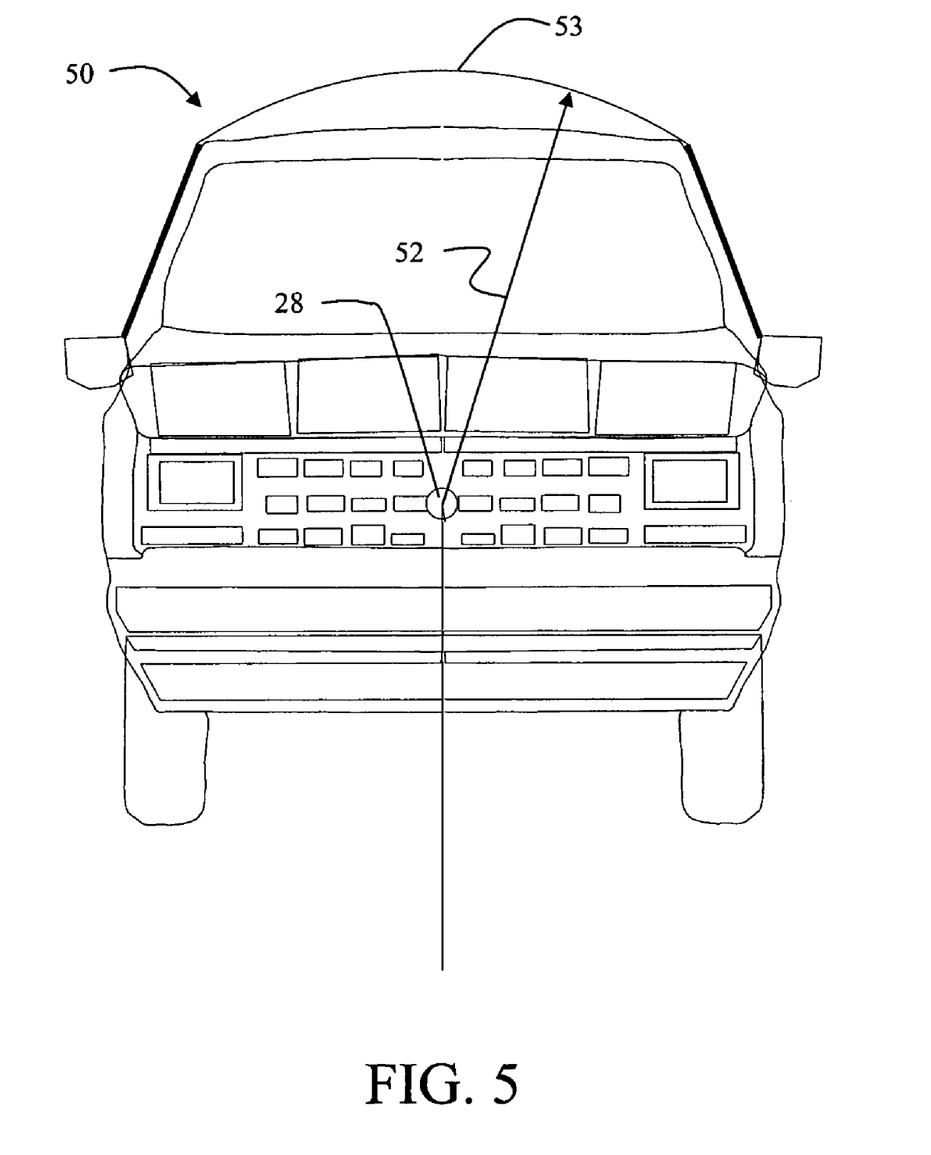
FIG. 5 is a front view of a vehicle incorporating a hoop radius according to the present invention.

The structural requirements to achieve the necessary strength are directly proportional to the geometric shape of the roof exterior or contact surface on which the vehicle will roll. The present invention provides a range of effective minor radii for a geometry established for reduction in far side aggressivity in the roll contact surface for the vehicle thereby increasing the roll crush resistance for a vehicle 50 as shown in FIG. 5. The hoop radius 52 from the center of mass to a roof line 53 for optimum performance should preferably be equal to the major radius within a range of +0 to 5% with ends faired to the side structure, nominally the A pillar profile, as shown in FIG. 5. The system is estimated to be reasonably effective with original or dynamically deforming radii of +10% and −5% with the ends faired to the side structure. There is some sensitivity to the matched radius in minimizing the forces on the far side which is estimated to be zero to 2% less than the corner.

A vehicle incorporating the geometry of the present invention in an integral roof structure as the roll contact surface provides the benefit of a monocoque or semi-monocoque structure relying on the stressed skin of the roof as a structural element thus reducing the size and strength of the internal structural members of the vehicle frame to achieve the desired rollover crush resistance. Such a monocoque structure may in exemplary embodiments employ sheet metal skins with metal ribs or formers, or a fiberglass or other composite structure.

Original equipment manufacturing (OEM) of vehicles with the geometric shape according to this invention can provide significant improvement in roll deformation resistance without significant increase in actual strength of structural members or conversely structural members having current strength for conventional vehicles will provide adequate structural strength to avoid deformation during roll which would not be possible with the current vehicle profiles. The embodiment of the geometry in OEM can be accomplished with standard welded production sheet metal construction adding little additional weight and cost while significantly reducing (by 50% or more) the far side roof crush as compared to that resulting from the original design in the worst foreseeable planar rollover conditions.

Often product safety improvements are somewhat subordinated features in sales materials to more evident and useful everyday purposes which can be accommodated as ancillary features with the geometry of the present invention such as a long built in storage place for skis, or additional stand-up aisle or middle seat head room or aerodynamically shaped lower drag for fuel economy, or round shaped side glazing for better skyward sightseeing.

Current design vehicles can be provided for by Original Equipment Suppliers (OES) or retrofitted with a rollover protection structure (RPS) that provides the benefits of the geometry of the current invention with the beneficial roll deformation resistance but without requiring the addition of significant vertical structural members as required in present RPS devices. As shown in FIGS. 6-9, the RPS 60 includes an arcuate member 62, shaped as a byte of the hoop radius, which is mounted between two side rails 64, 66 on a nominally flat roofline 67. The arcuate member provides the roll contact surface at the designed hoop radius. The arcuate member is supported at an angle 68 relative to the roof by forward angled supports 70 and rearward angled supports 72. Hoop radius 52 is also shown. A front lateral member 74 extending between the side rails provides attachment for the forward angled supports and a midships lateral member 76 between the side rails provides attachment for the rearward angled supports. In the embodiment shown, the rearward angled supports attach at a single boss 78. Forward diagonal surface members 80 and 82 extend from the intersection of the front lateral member and side rail to the boss and rearward diagonal surface members 84 and 86 extend from the boss to the trailing end points of the side rails. A rear lateral member 88 extends between the trailing end points of the side rails.

In the exemplary embodiment shown in the drawings, the RPS was fabricated using 1.625 in. diameter steel tube with a wall thickness of 0.125 in. for the arcuate member. Support structure for the side rails were fabricated from 1.0 in. by 2.0 in rectangular stock with a wall thickness of 0.125 while the angle support members employed 1.0 in by 1.0 in square tube with 0.125 in wall thickness. All elements used hot rolled steel with 26,000 psi strength.

The RPS provides a cap establishing and maintaining a roof line contact surface spaced from the center of mass by a hoop radius substantially equal to a major radius of roll contact from the roll axis. The exemplary embodiments have employed steel for the arcuate member and other elements of the cap, however, alternative embodiments employ cast, molded or composite materials of sufficient structural rigidity. Retrofit or production construction can be effected with welded, bolted and glued alternative materials such as high strength steel, aluminum, fiberglass and carbon fiber sheets, as well as molded, formed or extruded techniques.

While the geometry of the present invention reduces the structural support requirements over prior art designs, performance in especially hazardous rollover conditions such as rugged terrain, military, paramilitary and security forces (like secret service armored SUVs), and in mining operations, it may be necessary in retrofit designs to provide protection beyond the capability of the geometry and the strength of the existing production supporting pillars. In such cases the strength of the additional roof structure will exceed the capability of the pillars and the associated embodiment of the present invention includes internal or external "buttresses" reinforcing the joints between the "B-pillars" and the roof. There are at least two types, internal and external.

An exemplary internal structure is an inverted L-shaped bracket bolted to the B-pillars and to the roof structure through the roof rail. Although minimally intrusive, for diplomatic, ambassadorial and presidential purposes it may be desirable to provide the buttresses externally.

A special problem exists in certain four door vehicles in that the front door closes and latches on the B-pillar, while the rear door is hinged on the B-pillar, and both exterior door skins are close fitting along the vertical center line of the B-pillar. An exemplary external buttress solution is to drill two or more approximately 1.25" holes through the external skin of the doors at the B-pillar centerline and locate and fasten 1" diameter stand-offs through those holes to the B-pillar. The standoffs are attached to each other by a rearward offset bar extending vertically and bolted to the roof structure. This bar is a truss to the B-pillar strengthening it, attaching to the roof structure and providing the clearance necessary for the doors to open (the front door opens out and clears the rearward biased bar, while the rear door opens inward at its forward edge).

In certain roll scenarios, if the vehicle center of gravity is shifted aft due to passenger loading or geometric design of the vehicle, roll contact may occur on the aft portion of the roof. Additionally, the configuration of the vehicle, relative CG positioning and the actual tripping scenario inducing the roll may result in a pitch moment of inertia and associated radius of gyration which causes the vehicle to wobble like a football or roll on the aft portion of the roof. As such the placement of the arcuate member longitudinally on the vehicle differing from the embodiments shown and described with respect to FIG. 6 or use of at least one additional arcuate member may be employed to assure that the hoop radius for the actual resulting contact surface is maintained. This assures protection of passengers in all seat locations.

Figure 9:
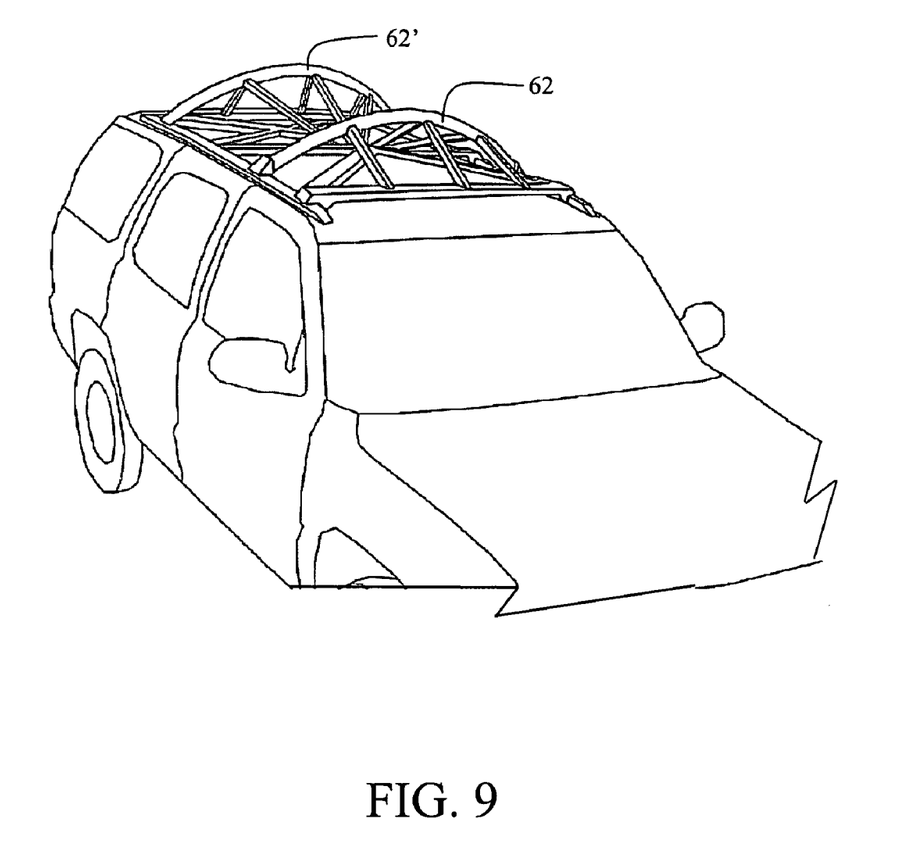
FIG. 9 is an isometric view of a RPS with an additional hoop radius support.

To accommodate dynamics resulting from such a roll with the major and minor radii taken at a section in the aft portion of the vehicle, a second hoop radius is established at that section with an arcuate support as a byte defined by that radius to avoid roof crush at that location. In a view as shown in FIG. 9 a second arcuate member 62' is employed in a position near the C pillar for an extended Sport Utility Vehicle to accommodate a rearward CG shift of greater than 5%. Such positioning provides protection for occupants of aft rows of seating in the vehicle. With a monocoque structure as previously described for such extended vehicles, the desired hoop radius is extended along the length of the monocoque roof to achieve the desired hoop radii at both a forward and aft roof position.

Figure 6:
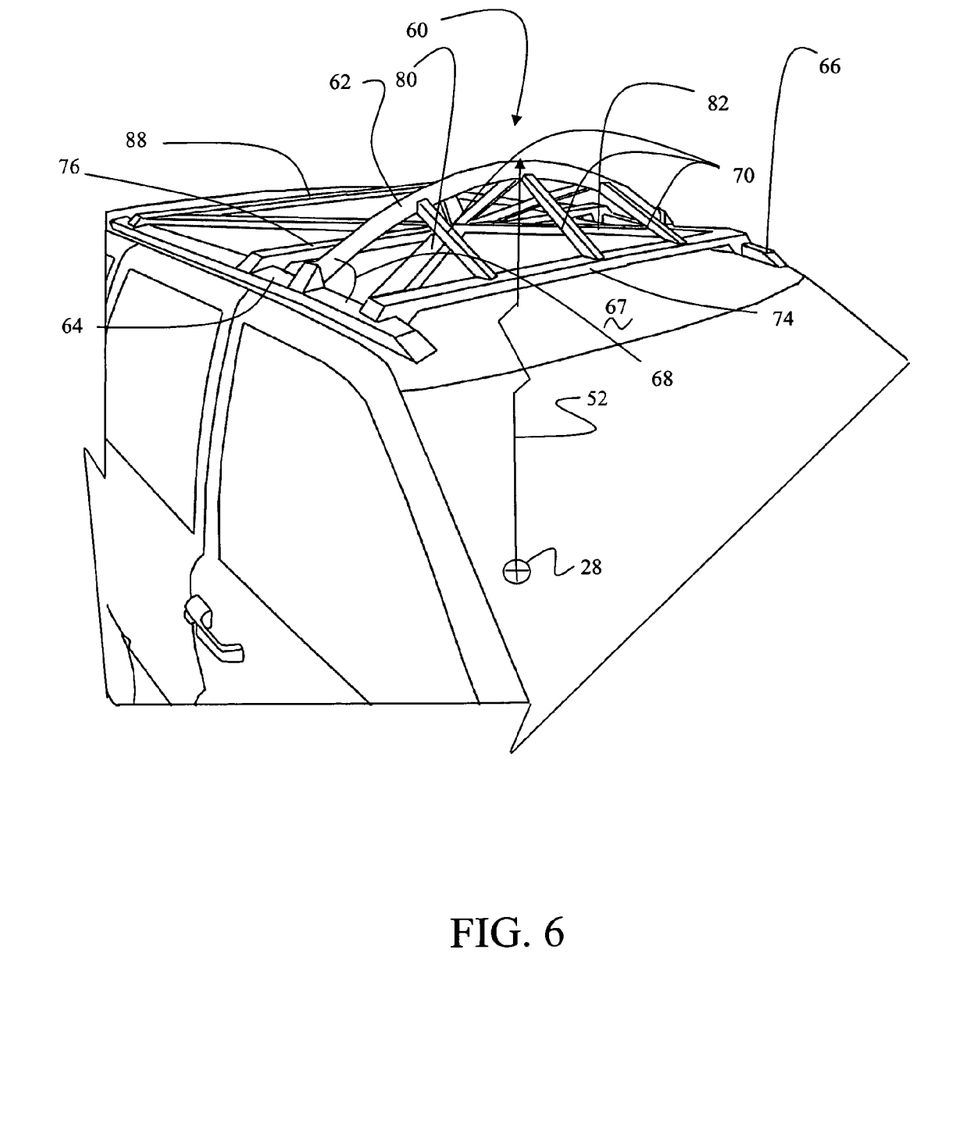
FIG. 6 is an isometric view of a rollover protection structure (RPS) implemented on an existing vehicle as either an original equipment manufacturing or aftermarket retrofit.
Figure 7:
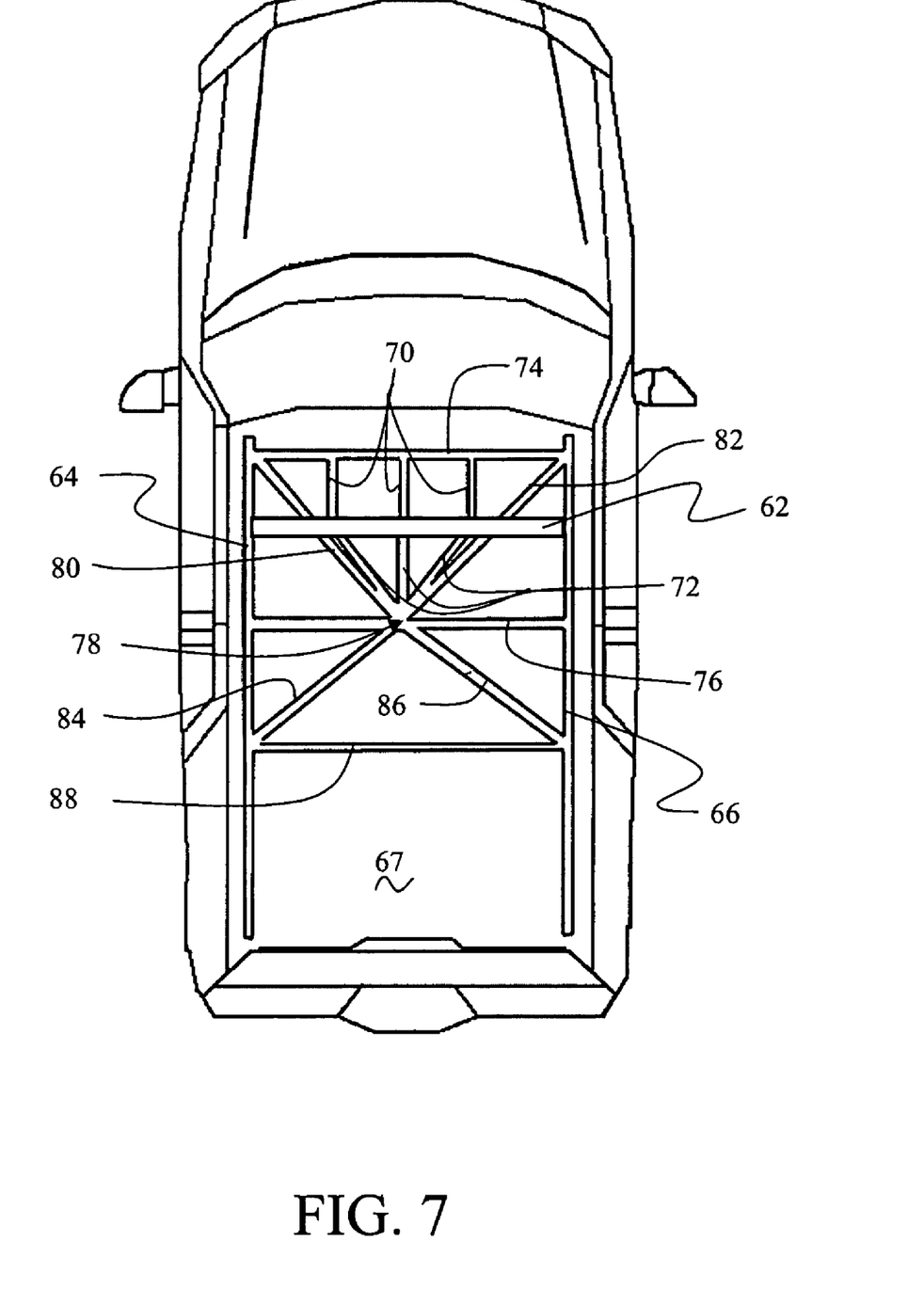
FIG. 7 is top view of the RPS of FIG. 6.
Figure 8:
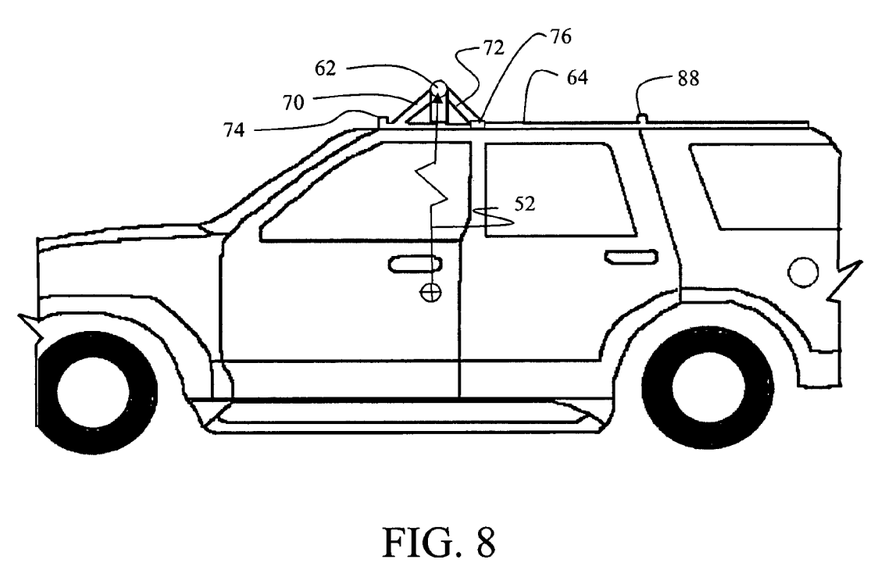
FIG. 8 is a side view of the RPS of FIG. 6.
Figure 10:
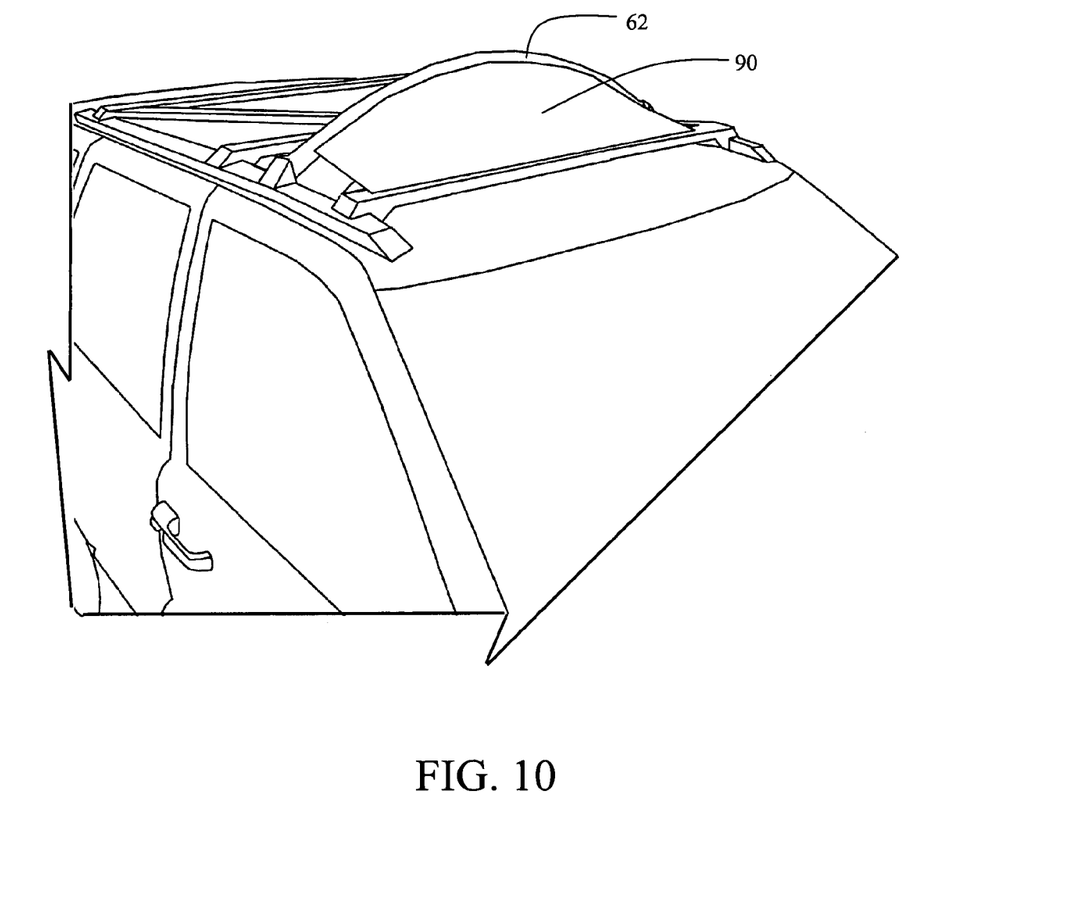
FIG. 10 is an isometric view of the RPS of FIG. 6 with a composite wind deflector.

The RPS can additionally be fitted with a fiberglass wind deflector 90 as shown in FIG. 10 for enhanced aerodynamic performance. The deflector may provide only a front shield as shown or a complete encapsulation of the RPS structure. The RPS structure as shown in FIG. 6 or 9, with or without the deflector, may include conventional roof rack elements for carrying luggage, bicycles or other goods and be supplied as an aftermarket kit to be added to a vehicle.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A vehicle geometry for rollover crush resistance comprising:
    a center of mass providing a roll axis;
    a roof line contact surface spaced from the center of mass by a continuous hoop radius substantially equal to a major radius of roll contact from the roll axis.
2. The vehicle geometry as defined in claim 1 wherein the hoop radius is equal to the major radius +10% and −5%.
3. The vehicle geometry as defined in claim 1 wherein the hoop radius is faired into the sides of the vehicle.
4. The vehicle geometry as defined in claim 3 for a vehicle with A pillars wherein the hoop radius is faired into the profile of the A-pillars.
5. The vehicle geometry as defined in claim 1 wherein the roof line contact surface is structurally supported as a monocoque structure.
6. The vehicle geometry as defined in claim 2 wherein the hoop radius is optimized as equal to the major radius +5%.
7. A method for increasing vehicle rollover crush resistance comprising:
    establishing a center of mass for determination of a roll axis; and
    shaping a roll contact surface of the vehicle to a hoop radius which minimizes far side aggressivity.
8. The method as defined in claim 7 wherein the step of shaping the roll contact surface comprises establishing a hoop radius substantially equal to a major radius of roll contact from the roll axis.
9. The method as defined in claim 8 wherein the step of establishing a hoop radius provides a radius equal to the major radius +10% and −5%.
10. The method as defined in claim 9 wherein the radius is optimized as equal to the major radius +5% and −0%.
11. The method as defined in claim 7 further comprising the step of fabricating the roof with a monocoque structure to create the hoop radius.
12. The method as defined in claim 7 further comprising the step of fairing the hoop radius into the vehicle sides.
13. The method as defined in claim 12 for a vehicle with A pillars wherein the step of fairing comprises fairing the hoop radius into the A-pillar profile.
14. A rollover protection system for a vehicle comprises an arcuate member extending from a nominally flat roofline, said arcuate member having a continuous hoop radius substantially equal to a major radius of roll contact from a center of mass providing a roll axis.
15. The rollover protection system defined in claim 14 wherein the arcuate member is faired to the sides of the vehicle.
16. The rollover protection system defined in claim 15 wherein the hoop radius is equal to the major radius +10% and −5%.
17. The rollover protection system defined in claim 16 wherein the hoop radius is optimized as equal to the major radius +5% and −0%.
18. The rollover protection system as defined in claim 14 further comprising side rails mounted substantially at the intersection between the nominally flat roofline and each side of the vehicle, said arcuate member attached to the side rails.
19. The rollover protection system as defined in claim 18 further comprising angled forward supports extending from the arcuate member to the roofline.
20. The rollover protection system as defined in claim 18 further comprising angled rearward supports extending from the arcuate member to the roofline.
21. The rollover protection system as defined in claim 19 further comprising a front lateral member extending between the side rails and providing an attachment for the forward angled supports.
22. The rollover protection system as defined in claim 20 further comprising a midships lateral member extending between the side rails and providing an attachment for the rearward angled supports.
23. A rollover protection system comprising:
    at least one arcuate member extending from a nominally flat roofline of a vehicle, said arcuate member faired to the sides of the vehicle and having a continuous hoop radius substantially equal to a major radius of roll contact from a center of mass providing a roll axis;
    side rails mounted substantially at the intersection between the nominally flat roofline and each side of the vehicle, said arcuate member attached to the side rails;
    a plurality of angled forward supports extending from the arcuate member to the roofline and attached to a front lateral member extending between the side rails;
    a plurality of angled rearward supports extending from the arcuate member to the roofline and attached to a midships lateral member extending between the side rails.
24. The rollover protection system as defined in claim 23 wherein the hoop radius is equal to the major radius +10% and −5%.
25. The rollover protection system defined in claim 24 wherein the hoop radius is optimized as equal to the major radius +5% and −0%.
26. The rollover protection system defined in claim 23 wherein the arcuate member, side rails, forward and rearward supports, front and midships lateral members are provided as a retrofit kit.
27. A rollover protection system comprising:
    at least one arcuate member extending from a nominally flat roofline of a vehicle, said arcuate member faired to the sides of the vehicle and having a hoop radius substantially equal to a major radius of roll contact from a center of mass providing a roll axis;
    side rails mounted substantially at the intersection between the nominally flat roofline and each side of the vehicle, said arcuate member attached to the side rails;
    a plurality of angled forward supports extending from the arcuate member to the roofline and attached to a front lateral member extending between the side rails;
    a plurality of angled rearward supports extending from the arcuate member to the roofline and attached to a midships lateral member extending between the side rails;
    a plurality of angled rearward supports extending from the arcuate member to the roofline and attached to a midships lateral member extending between the side rails, said arcuate member, side rails, forward and rearward supports, front and midships lateral members provided as a retrofit kit; and
    an aerodynamic fairing.

* * * * *